United States Patent [19]

Mitra et al.

[11] Patent Number: 5,533,063
[45] Date of Patent: Jul. 2, 1996

[54] METHOD AND APPARATUS FOR MULTIPATH CHANNEL SHAPING

[75] Inventors: Sanjit K. Mitra, Santa Barbara; Eduardo Abreu, Goleta, both of Calif.; Rossano Marchesani, Chieti, Italy

[73] Assignee: The Regents of the University of California, Oakland, Calif.

[21] Appl. No.: 189,959

[22] Filed: Jan. 31, 1994

[51] Int. Cl.$^6$ ................................................. H03D 1/00
[52] U.S. Cl. .................... 375/340; 375/231; 375/232; 375/262; 375/349; 375/350; 455/65; 348/614
[58] Field of Search ........................ 375/121, 13, 14, 375/94, 99, 102, 103, 229, 230–232, 285, 340, 341, 346, 350, 262, 349; 364/724.91, 724.2; 455/307, 52.3, 65; 348/607, 614

[56] References Cited

U.S. PATENT DOCUMENTS

| | | | |
|---|---|---|---|
| 4,051,438 | 9/1977 | Pickett et al. | 325/45 |
| 4,080,600 | 3/1978 | Toman | 343/106 R |
| 4,412,100 | 10/1983 | Orban | 381/100 |
| 4,532,639 | 7/1985 | Price et al. | 375/96 |
| 4,701,936 | 10/1987 | Clark et al. | 375/350 |
| 4,757,319 | 7/1988 | Lanki | 342/378 |
| 4,797,923 | 1/1989 | Clarke | 381/37 |
| 4,800,572 | 1/1989 | Nossek et al. | 375/14 |
| 4,873,683 | 10/1989 | Borth et al. | 370/95.1 |
| 4,956,867 | 9/1990 | Zurek et al. | 381/94.1 |
| 4,977,580 | 12/1990 | McNicol | 375/97 |
| 5,005,189 | 4/1991 | Hackett, Jr. | 375/101 |
| 5,119,196 | 6/1992 | Ayanoglu et al. | 348/614 |
| 5,127,051 | 6/1992 | Chan et al. | 380/49 |
| 5,142,551 | 8/1992 | Borth et al. | 375/7 |
| 5,148,488 | 9/1992 | Chen et al. | 381/47 |
| 5,177,455 | 1/1993 | Bennett | 332/103 |
| 5,263,026 | 11/1993 | Parr et al. | 375/94 |
| 5,293,401 | 3/1994 | Serfaty | 375/14 |
| 5,394,473 | 2/1995 | Davidson | 381/36 |

OTHER PUBLICATIONS

Czarnach (1982) IEEE Trans. Acoust. vol. ASSP–30, No. 3, 363–370.
Harasty et al. (1988) IEEE D9.9 Tele. Sig. Deghost. 1778–1781.
Mitra et al. (1974) IEEE Trans. Cir. vol. CAS–21, No. 3 688–700.
Regalia et al. (1988) Proc. IEEE vol. 76, No. 1 19–37.
Mitra et al. (1992) IEEE "A Novel Implementation . . . " 2312–2315.
Forney (1972) IEEE Trans. Inf. Theory vol. IT–18 No. 3 363–378.
Desblache (1977) IEEE Trans. Comm. "Optimal Short . . . " 735–738.
Beare (1978) IEEE Trans. Comm. vol. COM–26, No. 8 1301–1307.
Benvenuto et al. (undated) "Multitrellis Decomp. of the Viterbi Algorithm for Multipath Channels" 5 pages.

Primary Examiner—Stephen Chin
Assistant Examiner—Amanda T. Le
Attorney, Agent, or Firm—John P. O'Banion

[57] ABSTRACT

A method and apparatus for shaping the impulse response of a non-minimum phase communications channel, by reversing the CIR without enhancing the noise level using non-causal allpass filters is disclosed. Unstable allpass filters are implemented as stable non-causal filters operating in reversed time to obtain a minimum phase response from a non-minimum phase CIR. The original CIR is estimated using adaptive algorithms, and the coefficients of the allpass filters are taken directly from the estimated CIR. The cascade of the channel and allpass filter has an impulse response that is the approximate time reversed version of the original CIR. A "block" allpass equalizer and an "optimal" allpass equalizer are used in a two-stage filter to increase system performance. Other multiple stage filter configurations are disclosed, which can include use of decision feedback equalizer (DFE) decoders as well as Viterbi decoders. The invention is effective in the case of two-path channels, but can also give satisfactory results when more paths are present. Moreover, the present invention is well suited to "sharpening" the CIR with only minor variations in noise level. A minimum phase desired impulse response (DIR) can be obtained with only a few nonzero samples, leading to a substantial reduction in complexity of the Viterbi algorithm, with only minor variations in the noise level.

10 Claims, 12 Drawing Sheets

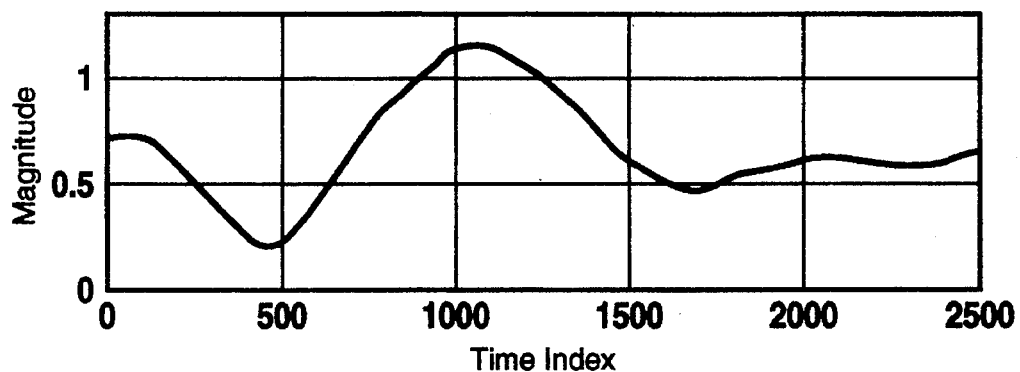
FIG. — 2
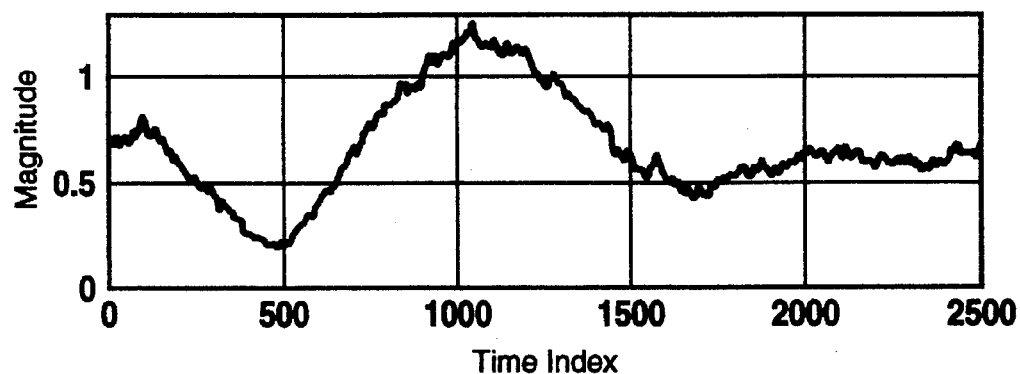
FIG. — 3
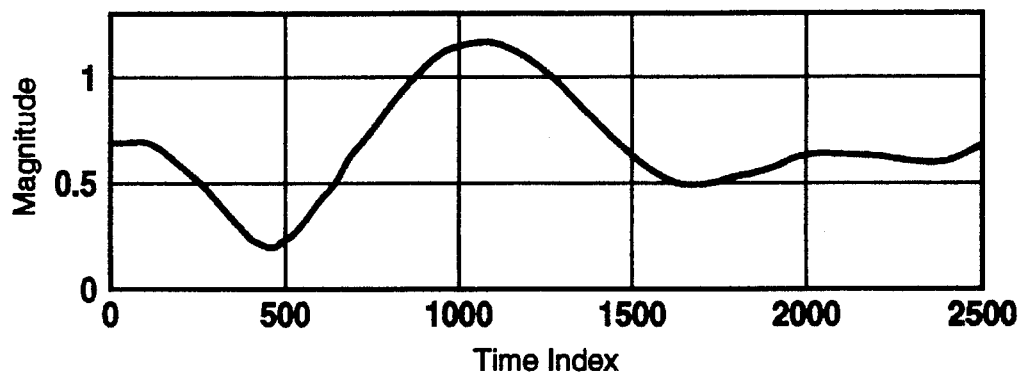
FIG. — 4

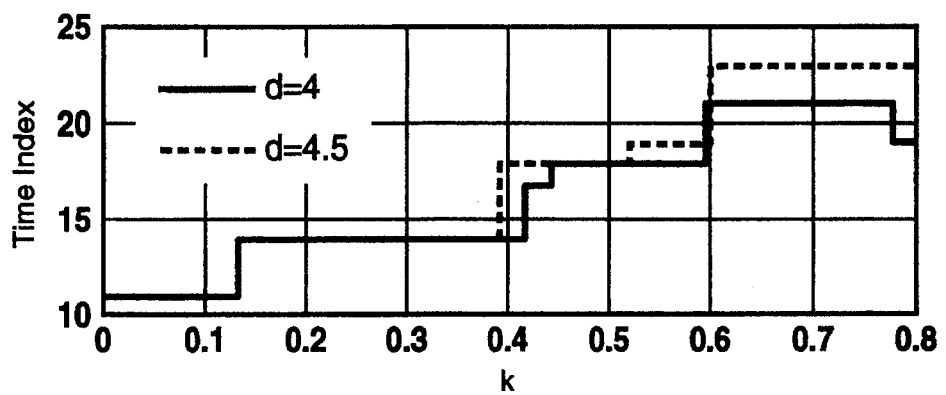
FIG. — 8
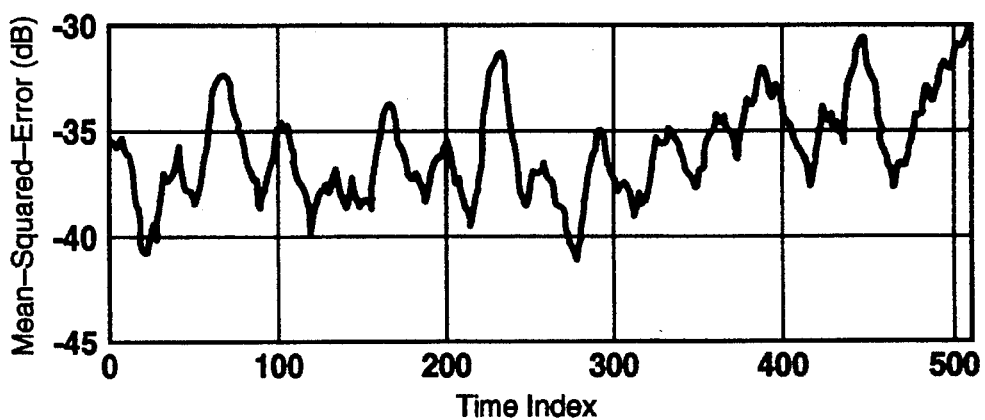
FIG. — 9
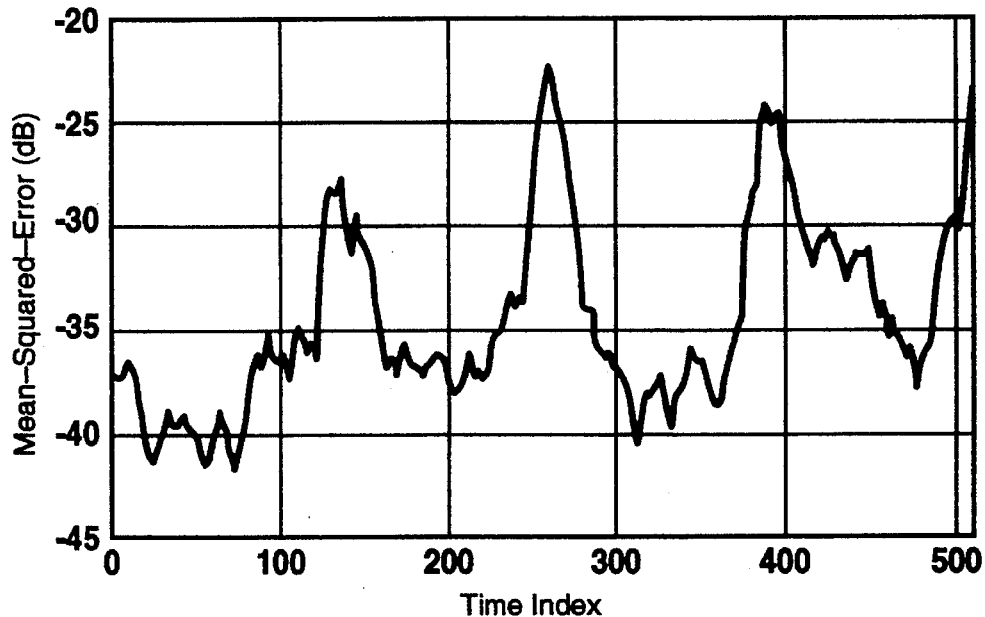
FIG. — 10

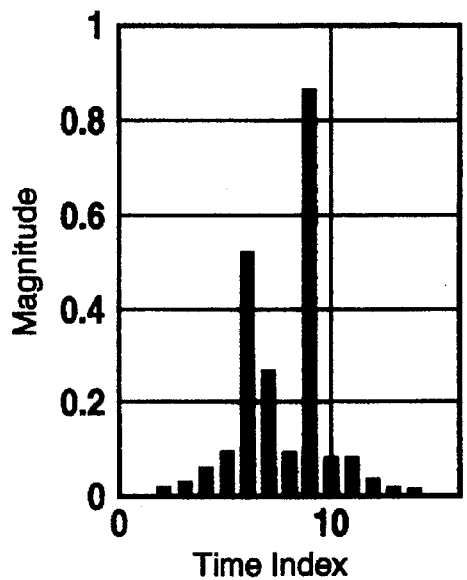
FIG. — 16A
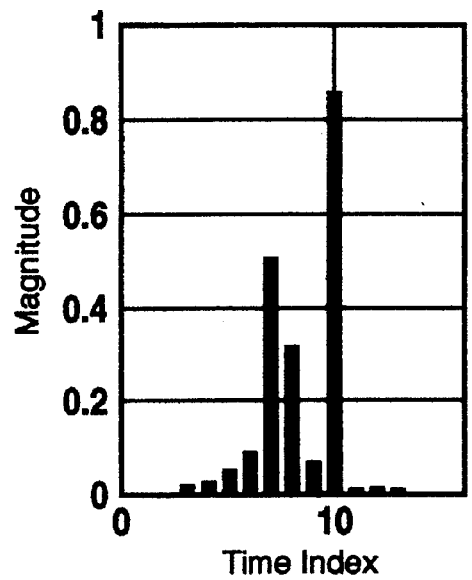
FIG. — 16B
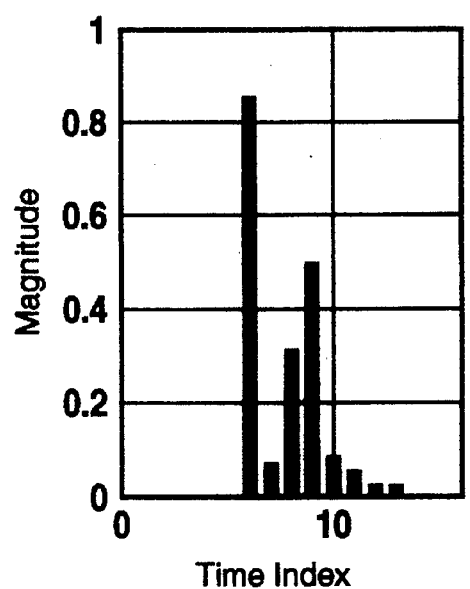
FIG. — 16C
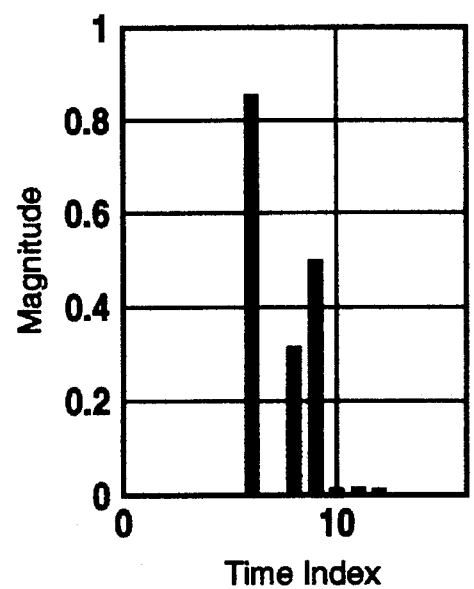
FIG. — 16D

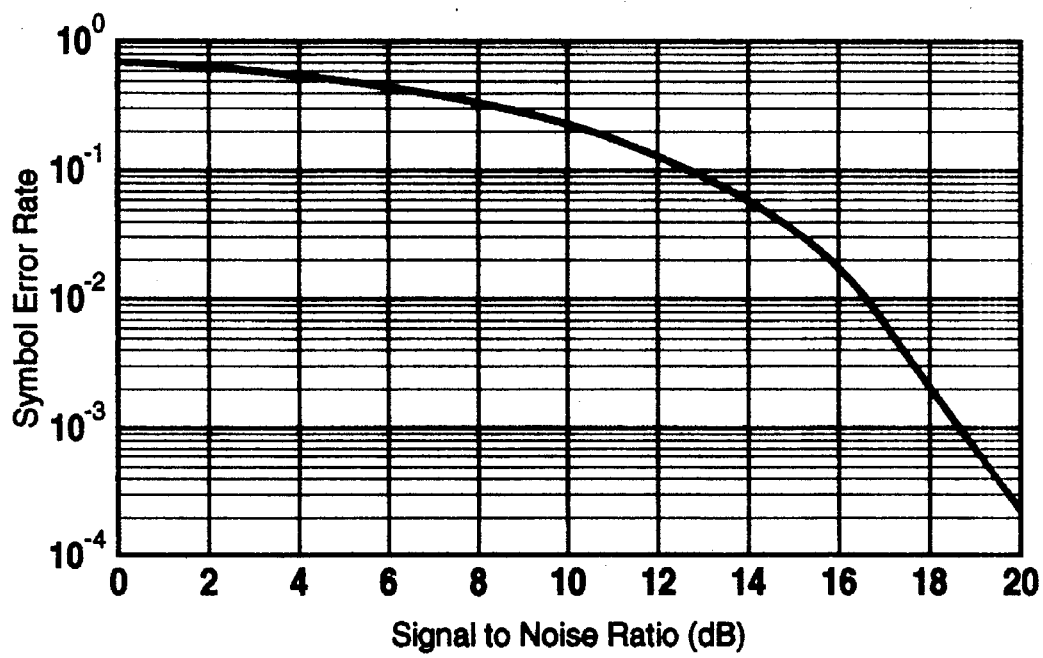
FIG. —23
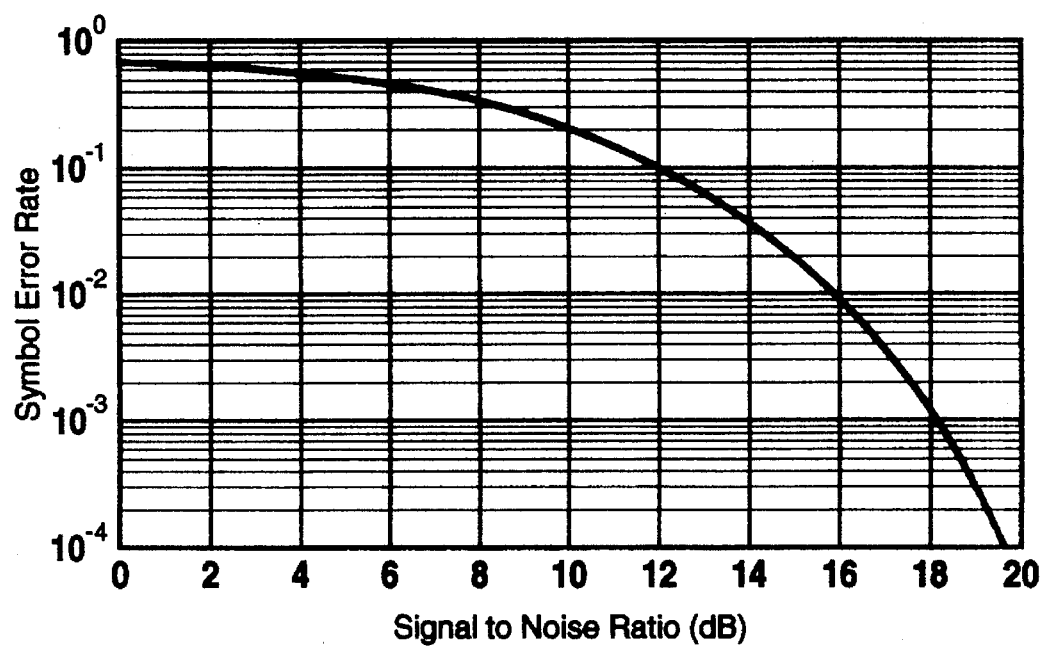
FIG. —24

METHOD AND APPARATUS FOR MULTIPATH CHANNEL SHAPING

BACKGROUND OF THE INVENTION

1. Field of the Invention

This invention pertains generally to receiving digital radio frequency communications signals, and more particularly to extracting a signal of interest from noise and interfering multipath signals.

2. Description of the Background Art

The problem of extracting a signal from a noisy environment is well known in the signal processing arts. In a typical high frequency (HF) environment, phase shifted multipath and Doppler spread interference can result from ionospheric reflections. In addition, reflections from obstructions in the path of the signal can cause reflections of signals at other frequencies. The fundamental problem facing any receiver designer is how to improve the reception of a signal of interest in the presence of unknown and undesired interfering signals. In principle, this can be accomplished by signal processing.

Where data streams are involved, decoders employing the Viterbi algorithm have heretofore been considered to be the optimum method for detection of a data sequence in the presence of intersymbol interference and additive Gaussian noise. However, the computational complexity of Viterbi decoders is very large—approximately $P^L$, where P is the size of the signal set and L is the length of the channel impulse response (CIR). For this reason several simplifications have been developed, most of which are more effective when dealing with a minimum phase CIR. The simple decision feedback equalizer (DFE) decoder is also more efficient in the case of a minimum phase CIR.

In a typical HF environment, however, the combined effect of multipath and Doppler spread often causes the channel to have a non-minimum phase impulse response. A possible solution is to use a pre-equalizer before the decoder to get a shorter or minimum phase desired impulse response (DIR). This solution can have one or two types of disadvantages, however. First, the zeros of the CIR need to be computed and, second, the pre-equalizer could enhance the noise level.

Therefore, there is a need for a non-complex and easily implemented apparatus and method for extracting a signal of interest from interfering multipath and. Doppler spread signals which does not result in an unacceptable increase in noise. The present invention satisfies that need, as well as others, and overcomes deficiencies and limitations of prior methods and devices.

SUMMARY OF THE INVENTION

The present invention pertains generally to spatial filtering and decoding techniques, and more specifically to a method and apparatus for detecting a signal of interest which is embedded in interference, including noise and multipath channel and Doppler spread interference, by reversing the channel impulse response (CIR) without enhancing the noise level using non-causal allpass filters.

By way of example, and not of limitation, the present invention employs unstable allpass filters implemented as stable non-causal filters (equalizers) operating in reversed time to obtain a minimum phase desired impulse response (DIR) from a non-minimum phase CIR. First, the original time-varying CIR is estimated using adaptive algorithms. The coefficients of the allpass filters are then taken directly from the estimated CIR. The cascade of the channel and allpass filter has an impulse response that is the approximate time reversed version of the original CIR.

For unknown channels, the filtering is performed in consecutive blocks, since the filter coefficients are obtained from the estimated CIR. Here, the coefficients of the "block" allpass filter are constant and are obtained from the channel estimation for the previous block. The blocks are overlapped to reduce error from transients. Ideally, however, in order to minimize mismatching between the channel and the allpass filter, the filter should have time-varying coefficients. In order to implement such an "optimal" allpass filter, however, knowledge of the CIR is required. In most instances, prior knowledge of the time-varying CIR is not available and the channel estimate cannot be updated until the received signal is decoded. Therefore, the "optimal" allpass filter cannot be implemented directly. However, by using the "block" allpass filter as a first stage and an "optimal" allpass filter as a second stage, the decoded data from the "block" allpass stage can be used to estimate the CIR and obtain the coefficients for the "optimal" allpass stage. As a result, system performance can be significantly improved with relatively little increase in computational complexity. Further, residual mismatching can be eliminated if necessary by cascading causal and non-causal filters if desired. The present invention is very effective in the case of two-path channels, but can also give satisfactory results when more paths are present. Moreover, the present invention is well suited to "sharpening" the CIR with only minor variations in noise level. In other words, a DIR can be obtained with only a few nonzero samples, leading to a substantial reduction in complexity of the Viterbi decoding algorithm, with only minor variations in the noise level. This solution reduces the cost of the metric in the Viterbi algorithm and is suitable for the use with a Multitrellis Viterbi decoder.

An object of the invention is to extract a received signal of interest from interfering signals.

Another object of the invention is to filter multipath and Doppler spread interference from received signals.

Another object of the invention is to equalize multipath non-minimum phase channels using non-causal allpass filters.

Another object of the invention is to obtain a minimum phase desired impulse response for a channel using unstable allpass filters implemented as stable non-causal filters operating in reversed time.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 2 depicts the variation in time of the magnitude of an exemplary sample of the channel impulse response in the channel model of FIG. 1.

FIG. 3 depicts the variation in time of the magnitude of an estimate of the channel sample shown in FIG. 2.

FIG. 4 depicts the variation in time of the magnitude of the estimated channel sample shown in FIG. 3 after smoothing by averaging.

FIG. 8 shows a plot of the time the transient energy takes to decay to 1/100 after unitary excitation versus relative magnitude, k, for the two cases 4 T and 4.5 T.

FIG. 9 shows the mean-squared-error for the estimation using the "block" allpass filter of the present invention applied to the channel shown in FIG. 5 with a block size of 32.

FIG. 10 shows the mean-squared-error for the estimation using the "block" allpass filter of the present invention applied to the channel shown in FIG. 5 with a block size of 128.

FIG. 16A depicts an exemplary original non-minimum phase channel impulse response for C.C.I.R. Channel 4.

FIG. 16B depicts the desired impulse response obtained from the channel impulse response shown in FIG. 16A after equalization by the filter $A_z(z)$.

FIG. 16C depicts the desired impulse response obtained from the channel impulse response shown in FIG. 16A using a cascade of causal and non-causal filters without sharpening.

FIG. 16D depicts the desired impulse response obtained from the channel impulse response shown in FIG. 16A using a cascade of causal and non-causal filters with sharpening.

FIG. 23 shows the symbol error rate as a function of signal to noise ratio for an unknown C.C.I.R. Channel 5 using the "block" allpass filter of the present invention with a decision feedback equalizer decoder where the unknown channel was estimated using the decoded data.

FIG. 24 shows the symbol error rate as a function of signal to noise ratio for an unknown C.C.I.R. Channel 5 using a two-stage filtering scheme wherein a "block" allpass filter and decision feedback equalizer decoder are followed by an "optimal" allpass filter and decision feedback equalizer decoder.

DESCRIPTION OF THE PREFERRED EMBODIMENTS

Referring more specifically to the following disclosure and the drawings shown in FIG. 1 through FIG. 25, the present invention generally comprises an apparatus and method for filtering multipath and Doppler spread interference from a high frequency (HF) radio communications signal. It will be appreciated that the apparatus may vary as to configuration and as to details of the parts, and the method may vary as to the steps and their sequence, without departing from the basic concepts as disclosed herein.

Figure 1:
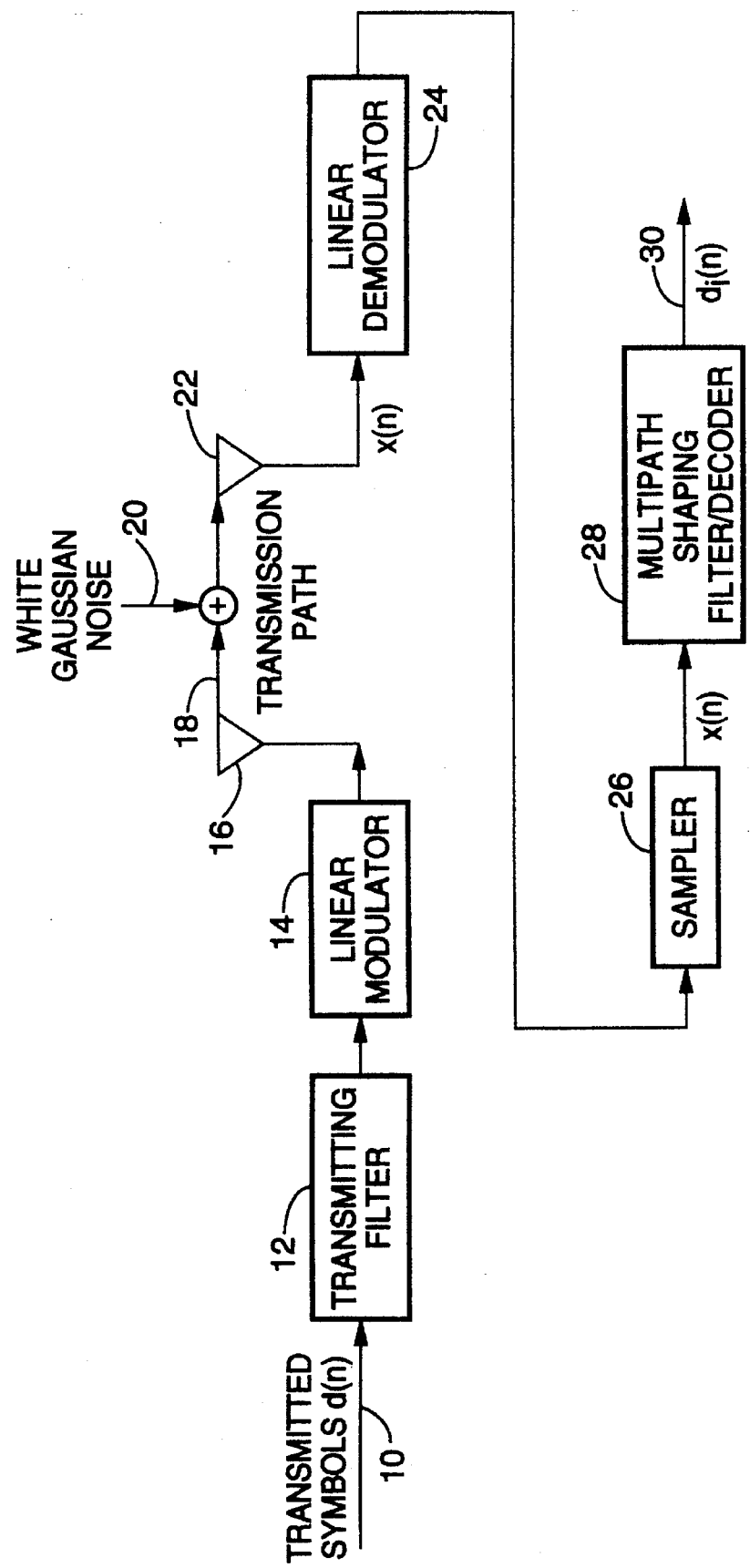
FIG. 1 is a block diagram of a communications channel model followed by a multipath shaping filter/decoder in accordance the present invention.

Referring to FIG. 1, a functional block diagram of a typical communications channel path is shown in relation to the present invention. Communications information 10, in the form of time-varying digital data symbols, d(n), or the like, is filtered and processed by a transmitting filter 12. The filtered information is then modulated using a linear modulator 14 and transmitted using an antenna 16. The signal of interest then travels over a transmission path 18 where multipath reflections and Doppler spread interference can arise. In addition, white Gaussian noise 20 can be introduced and cause interference. The radio frequency signal, which includes the signal of interest and interference, then impinges on a receive antenna 22 and is demodulated using a linear demodulator 24. The received signals x(n) are then sampled by a sampler 26 and processed, and filtered and decoded as appropriate by a multipath shaping filter/decoder 28 in accordance with the present invention. The processed and decoded data 30, or $d_i(n)$ where i=the number of filter/decoder stages in multipath shaping filter/decoder 28, is then output for further use. It will be appreciated that conventional radio frequency transmitting and receiving stages can be used, and that the present invention is embodied in the method and apparatus used for the multipath shaping filter/decoder 28.

1. Channel Estimation

A first step in the method of the present invention is to estimate the channel impulse response (CIR). In this regard, channel models based on recommendations of the International Radio Consulting Committee (C.C.I.R.) are used. For purposes of the description herein, reference is made to three different types of channels: (1) Channel 4 (C.C.I.R. moderate channel) which has two paths with the same average magnitude, a 1 ms relative delay, and a 0.5 Hz Doppler spread; (2) Channel 5 (C.C.I.R. poor channel) which has two paths with the same average magnitude, a 2 ms relative delay, and a 1 Hz Doppler spread, and (3) Channel 6 which has three paths with the same average magnitude, 1 ms and 3.3 ms relative delays, and a 3 Hz Doppler spread each; the symbol rate is 2400 Baud.

The CIR of the time-varying channel can be estimated using an adaptive algorithm. To this end, in particular, the least means squared (LMS) algorithm is well suited. For purposes of the estimation, the input (transmitted) signal is an 8-PSK random sequence preceded by a PN training sequence of 80 samples. The algorithm is initialized using a simple correlation method. To reduce the mean-squared-error (MSE), the sequence of estimated values for the CIR are averaged using a sliding window of fixed size. FIG. 2 shows the variation in time of the magnitude of an exemplary sample of the CIR. FIG. 3 shows the sequence of estimated values corresponding to FIG. 2. After averaging this sequence using a window of size 150, the smoothed sequence shown in FIG. 4 can be obtained, which is closer to the original channel variation shown in FIG. 2.

2. Non-Causal Allpass Equalizers

Figure 5:
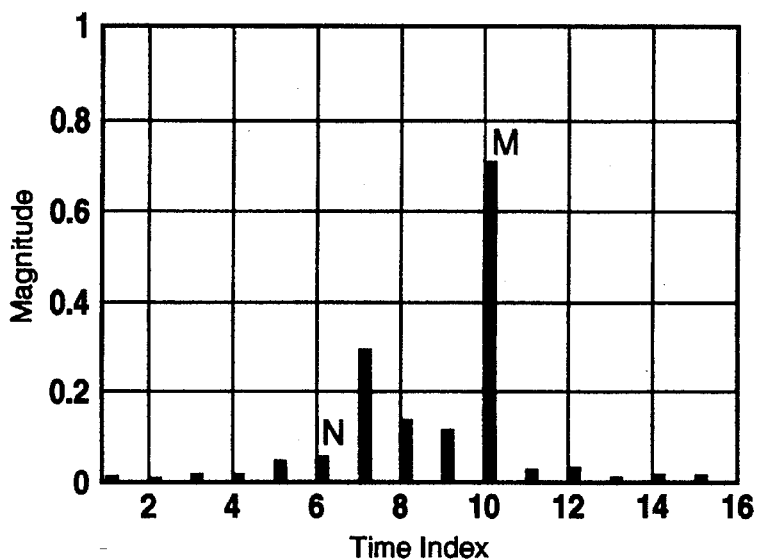
FIG. 5 shows the estimated magnitude of the channel impulse response of C.C.I.R. Channel 4 at a particular instant in time where it has non-minimum phase.
Figure 6:
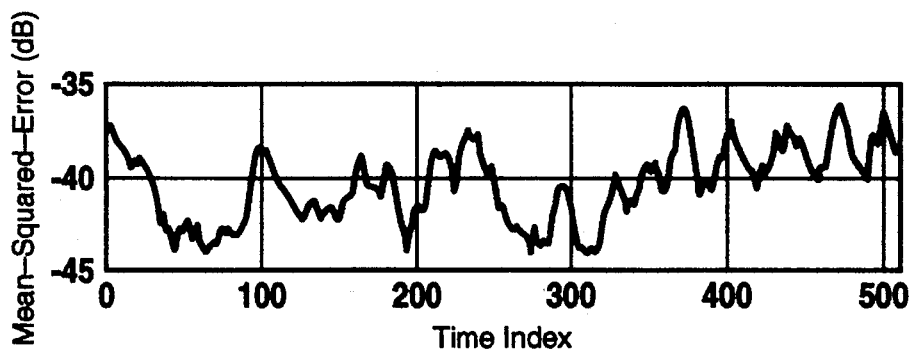
FIG. 6 shows the mean-squared-error for the estimated magnitude shown in FIG. 5.

For the description of the non-causal allpass filter, a two-path time-varying channel is first considered. Depending on the paths' relative magnitude, the CIR can have the non-minimum phase property. In this case, the CIR must be modified to obtain a minimum phase desired impulse response (DIR). FIG. 5 shows the estimated magnitude of the impulse response of Channel 4 at a particular instant in time where it has non-minimum phase, and FIG. 6 shows the MSE for the estimation, using the LMS method and averaging window of size 30 (SNR=40 dB).

Figure 7:
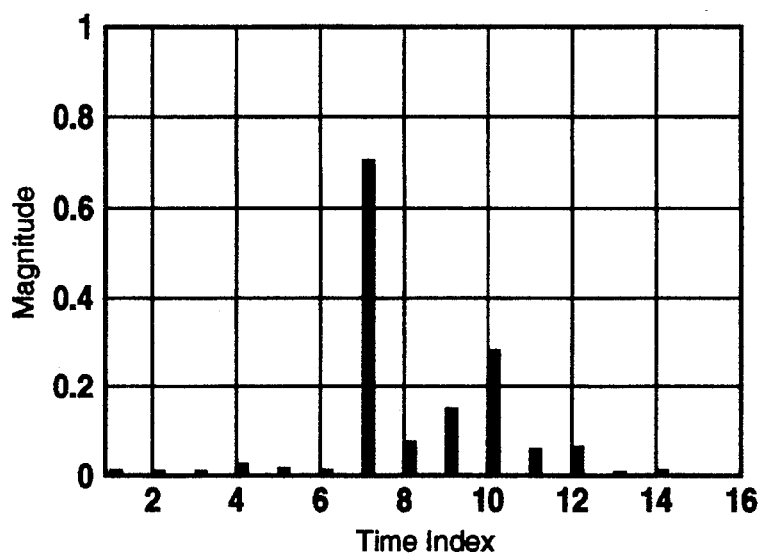
FIG. 7 shows the desired impulse response obtained by reversing the channel impulse response shown in FIG. 5 in accordance with the present invention.

The channel transfer function $H_{CIR}(z)$ can be written as:

$$H_{CIR}(z) = \sum_{i=0}^{L-1} h_i z^{-i} \quad (1)$$

where $z=e^{sT}$, s=the complex frequency variable, T=the sampling period, i=an index corresponding to an individual sample in the CIR, L=the length of the CIR, and $h_i$=the ith impulse response sample. This channel can then be reversed by using an allpass filter with coefficients taken from the CIR so that the transfer function of the allpass filter has the form:

$$A(z) = \frac{\sum_{i=N}^{M} h^*_{N+M-i} z^{-i+N}}{\sum_{i=N}^{M} h_i z^{-i+N}} \quad (2)$$

where A(z) is the non-causal allpass filter transform. Here, N and M must be chosen so as to ensure stability of the non-causal realization with minimum complexity. A criterion for the choice of N and M is described next. Since the objective is to reverse the CIR, N and M should be chosen as close as possible to zero and L−1, respectively. As reference points, a and b are defined such that $h_a$ and $h_b$ are channel samples of highest magnitude for the first and second paths, respectively. Then, $0 \leq N \leq a$ and M=b. A good tradeoff between complexity and accuracy using Channels 4 and 5 is usually achieved by setting $a-2 \leq N \leq a-1$. M must not exceed b, otherwise the non-causal implementation will be unstable. Summarizing, note that no coefficients corresponding to samples of the CIR following the second path are included in the allpass filter. Coefficients corresponding to samples preceding the first path can be included but, for reduced complexity, the initial samples can be discarded if the magnitudes of the coefficients left out are small. For the overall DIR $$H_{DIR}(z) = H_{CIR}(z)A(z) \quad (3)$$

an approximation of the time reversal of the CIR $$H_{DIR}(z) \approx z^{-L} H^*_{CIR}(z)A(1/z^*) \quad (4)$$

is then obtained. FIG. 7 shows the DIR obtained by reversing the CIR of FIG. 5 in accordance with these steps.

While the above allpass filter is unstable, it can be implemented as a stable non-causal filter operating in reversed time. The receiver holds and stores the received signal which is then reversed in order and fed through the stable filter $A(z^{-1})$. The output of $A(z^{-1})$ is again reversed to become the output of A(z).

The resulting filter gives a minimum phase overall channel without modifying the noise level.

3. Block Allpass Realizations

For unknown channels, however, the filtering must be done in blocks, since the filter coefficients are obtained from the estimated CIR. Here, the coefficients of the "block" allpass filter are constant and the coefficients for each data block are obtained from the channel estimation for the immediately preceding block. The radio frequency signal is sampled and the sampled signal is grouped into a series of consecutive blocks. The CIR is then estimated for each successive block. Two problems arise from this approach, however: first, a mismatching between the "block" allpass filter and the CIR; and second the filter's initial transient. The allpass mismatching depends on the fade rate of the channel and can be reduced by using small block sizes. To overcome the filter's initial transient, the blocks are partially overlapped and the filtered data corresponding to the transient in the overlap is discarded. The size of the overlap depends on the length of the initial transient which varies with the pole locations and therefore with the CIR. The length of the initial transient is determined by simulating a practical channel using two paths with Gaussian shapes in accordance with:

$$h_n = e^{-\frac{(n-8)^2}{0.8}} + ke^{-\frac{(n-8+d)^2}{0.8}}, \quad (5)$$

$$0 \leq k \leq 0.8, d \in \{4, 4.5\}$$

where $h_n$=the nth impulse response sample. Therefore, a training signal is used to estimate the CIR for the first block. FIG. 8 shows a plot of the time the transient energy takes to decay to 1/100, after unitary excitation, versus the paths' relative magnitude (k in Eq. (5)) for the two cases, respectively 4 T and 4.5 T time spacing. Extensive simulations using Channels 4 and 5 have shown that 16 data overlap is sufficient in most practical cases. For the last data block, the tail at the end of the block must be considered. Since transmission has ended, the tail dies down rapidly and only few extra samples are enough for the correct initialization. In many cases, the tail can be ignored completely with negligible effect in the performance.

In order to decode the data using the Viterbi algorithm it is necessary to estimate the obtained DIR. FIG. 9 and FIG. 10 show the MSE for the estimation using the "block" allpass for the same channel of FIG. 5 with block sizes 32 and 128 respectively. It is evident that too large block sizes result in mismatching due to the old channel estimation, while too small block sizes increase overhead unnecessarily.

Figure 11:
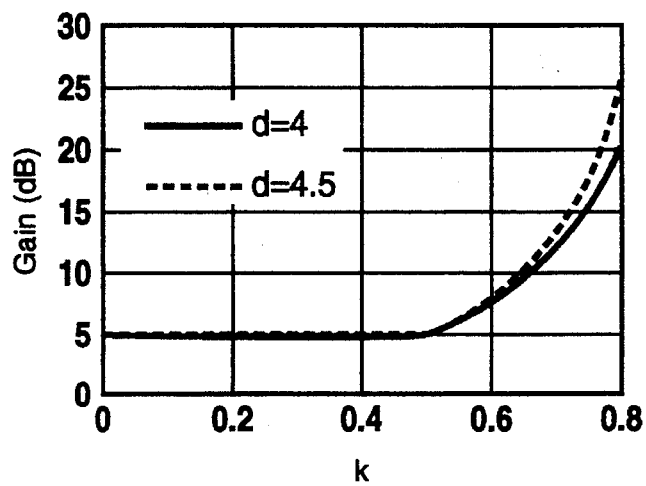
FIG. 11 shows the gain of the "block" allpass filter of the present invention applied to two different channels, for the two cases 4 T and 4.5 T.

Since a direct form implementation is preferred, the internal gain of the filter must be evaluated. FIG. 11 shows the maximum gain of the filter.

$$\frac{1}{\sum_{i=N}^{M} h_i z^{-1+N}} \quad (6)$$

according to the same conditions of FIG. 5.

The filter is stable and the method works well when the first path has up to approximately 7/10 the magnitude of the second path. This is not very restrictive because for larger relative magnitudes the magnitude of the first path is large enough to allow efficient decoding without reversal of the CIR.

However, at low signal-to-noise ratios (SNR) the filter may become unstable for relative magnitudes less than 7/10, due to large estimation errors. In that event, the filter must be modified. First, a threshold is established. Then, whenever the paths' relative magnitude exceeds the threshold, the allpass filter is altered by scaling the corresponding filter coefficients appropriately to ensure that the coefficients relative magnitude remains below the threshold level. In this way, the filter is stable under all practical operating conditions.

4. Inverse Optimal Allpass

The allpass filter should, for optimal results, have time-varying coefficients. To implement a time-varying allpass filter, or "optimal" allpass filter, knowledge of the CIR is assumed. Since, in most instances, prior knowledge of the time-varying CIR is not available, the time-varying CIR for the entire duration of transmission is estimated assuming prior knowledge of the transmitted data. The estimated values are averaged to reduce the mean-squared error (MSE), and the coefficients of the "optimal" allpass filter are then obtained from the averaged estimations.

Such an "optimal" allpass filter cannot be implemented directly, however, because the update in the estimation algorithm can only be done after the received signal has been decoded. However, by using the "block" allpass filter as a first stage and an "optimal" allpass filter as a second stage, the decoded data from the "block" allpass stage can be used to estimate the CIR and obtain the coefficients for the "optimal" allpass stage. As a result, system performance can be significantly improved with relatively little increase in computational complexity. This implementation is described in more detail in Section 6 below.

5. Allpass With Sharpening

It is of interest to equalize the CIR as much as possible to simplify the work of any downstream decoder used, but without enhancing excessively the noise level. To do so, the allpass filter is altered by replacing most of the coefficients in the numerator with zeros, but not changing the coefficients largest in magnitude, which are representative of the coarsely located ionospheric paths. In this way, only the dispersion of each path is reduced; intersymbol interference is not canceled.

Figure 12:
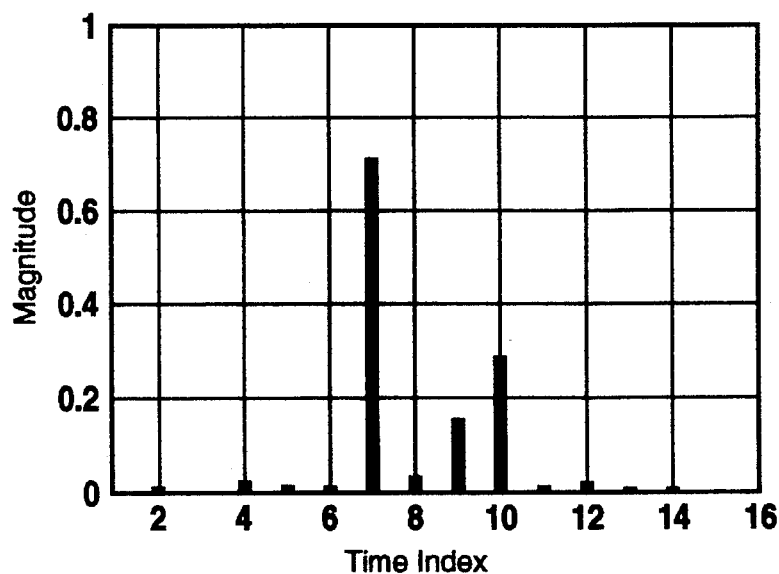
FIG. 12 shows the sharpened desired impulse response obtained in accordance with the present invention applied to the channel shown in FIG. 5.
Figure 13:
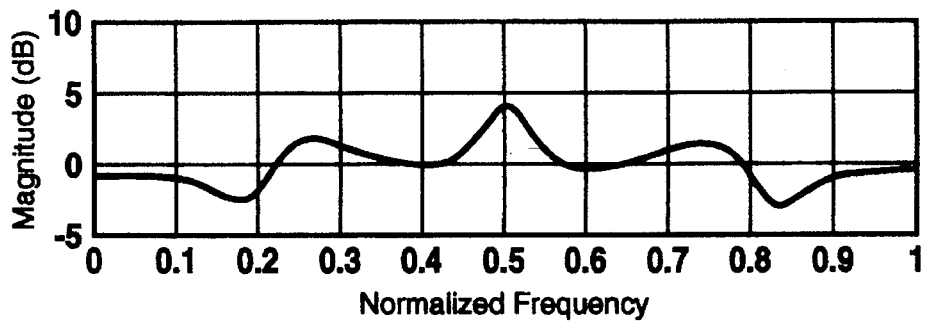
FIG. 13 shows the magnitude of the frequency response of a quasi-allpass filter in accordance with the present invention applied to the channel shown in FIG. 5.

The resulting filter is "quasi" allpass; it is still unstable and must be implemented in the same stable non-causal way. FIG. 12 shows the "sharpened" DIR obtained by applying this method (with 3 nonzero coefficients) to the same CIR of FIG. 5. FIG. 13 shows the magnitude of the frequency response of the quasi-allpass filter.

Simulations have been done to evaluate the noise enhancement due to the quasi-allpass filter. The results for some different channels are shown in Table 1.

TABLE 1

| Channel | Frames | SNR before equalizer (dB) | Noise Enhancement (dB) |
|---------|--------|---------------------------|------------------------|
| 4 | 3, 4 | 40 | 0.5 |
| 4 | 4, 4 | 40 | 1.1 |
| 4 | 3, 4 | 30 | 0.7 |
| 4 | 4, 5 | 30 | 1.6 |
| 4 | 3, 4 | 20 | 0.8 |
| 4 | 4, 5 | 20 | 0.7 |
| 5 | 4 | 40 | 1.0 |
| 5 | 10, 11 | 40 | 1.1 |
| 5 | 32, 33 | 30 | 0.4 |
| 5 | 10, 11 | 30 | 1.8 |
| 5 | 32, 33 | 20 | 0.4 |
| 5 | 38 | 20 | 1.2 |

Figure 14:
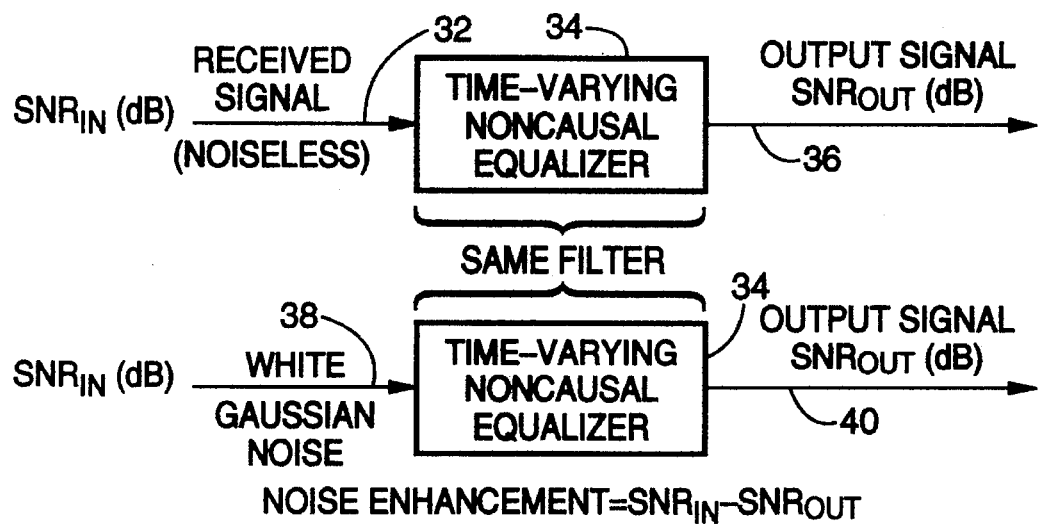
FIG. 14 is a functional block diagram showing a typical setup for measuring noise enhancement of the filters of the present invention.
Figure 25:
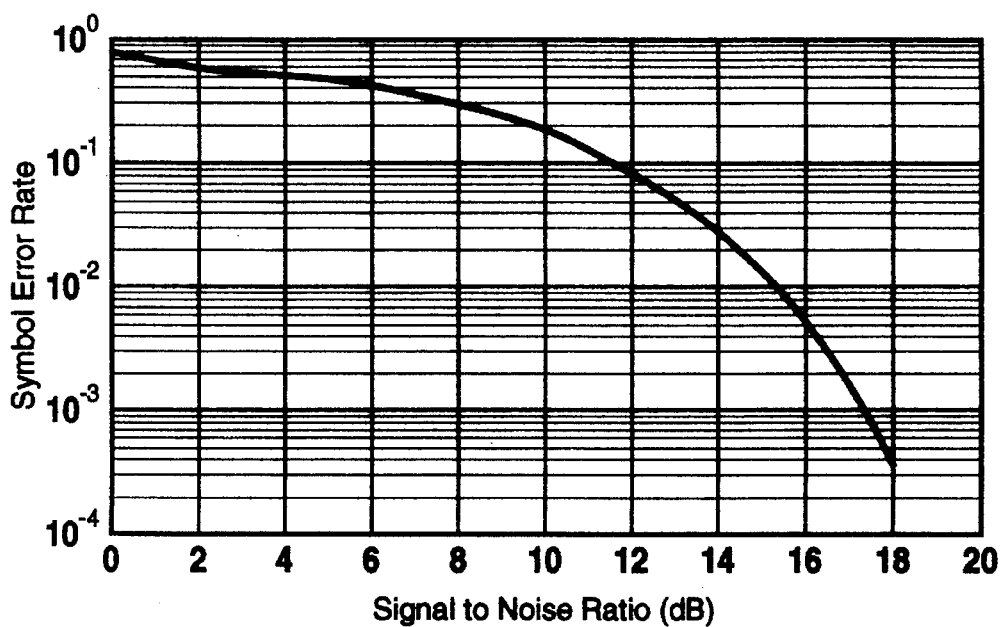
FIG. 25 shows the symbol error rate as a function of signal to noise ratio for an unknown C.C.I.R. Channel 5 using a two-stage filtering scheme wherein a "block" allpass filter and decision feedback equalizer decoder are followed by an "optimal" allpass filter and Multitrellis Viterbi decoder.

To compute the noise enhancement values, the setup shown in FIG. 14 was used. After equalizing the received signal 32 (assumed noiseless) using a time-varying non-causal quasi-allpass filter 34 as an equalizer and obtaining the output signal 36, the same time-varying non-causal quasi-allpass equalizer 34 was used to filter separately a sequence of white Gaussian noise 38 and obtain the output signal 40. Noise enhancement was obtained by evaluat to noise ratio (SNR) before and after the independent filtering of the two sequences by the same equalizer.

This kind of equalization produces only minor variations in the noise level, but substantially reduces the complexity in the metrics of the Viterbi decoder. Moreover it is well suited to be used with a Multitrellis Viterbi decoder.

6. Two-Pass Processing

As indicated in Section 4, the "optimal" allpass filter cannot be implemented directly because prior knowledge of the CIR is required (or knowledge of the transmitted data to estimate the channel). In most instances, prior knowledge of the time-varying CIR is not available and the channel estimate cannot be updated until the received signal is decoded. Therefore, the "optimal" allpass filter cannot be implemented directly. However, by using the "block" allpass filter as a first stage and an "optimal" allpass filter as a second stage, the decoded data from the "block" allpass stage can be used to estimate the CIR and obtain the coefficients for the "optimal" allpass stage. As a result, system performance can be significantly improved with relatively little increase in computational complexity. Further, residual mismatching can be eliminated if necessary by cascading causal and non-causal filters if desired.

Figure 15A:
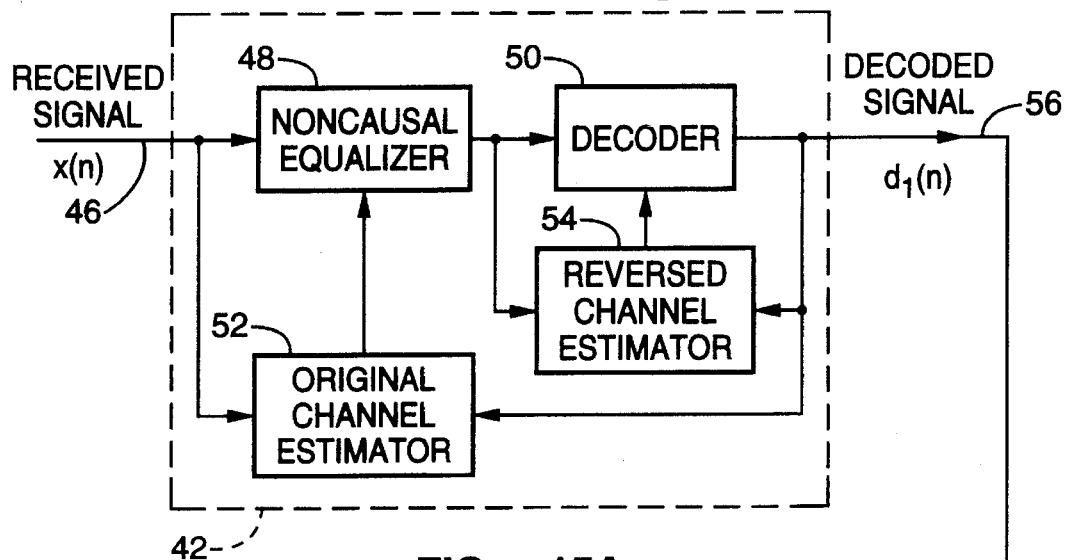
FIG. 15A is a functional block diagram of a "block" allpass filter in accordance with the present invention incorporated with a decoder.
Figure 15B:
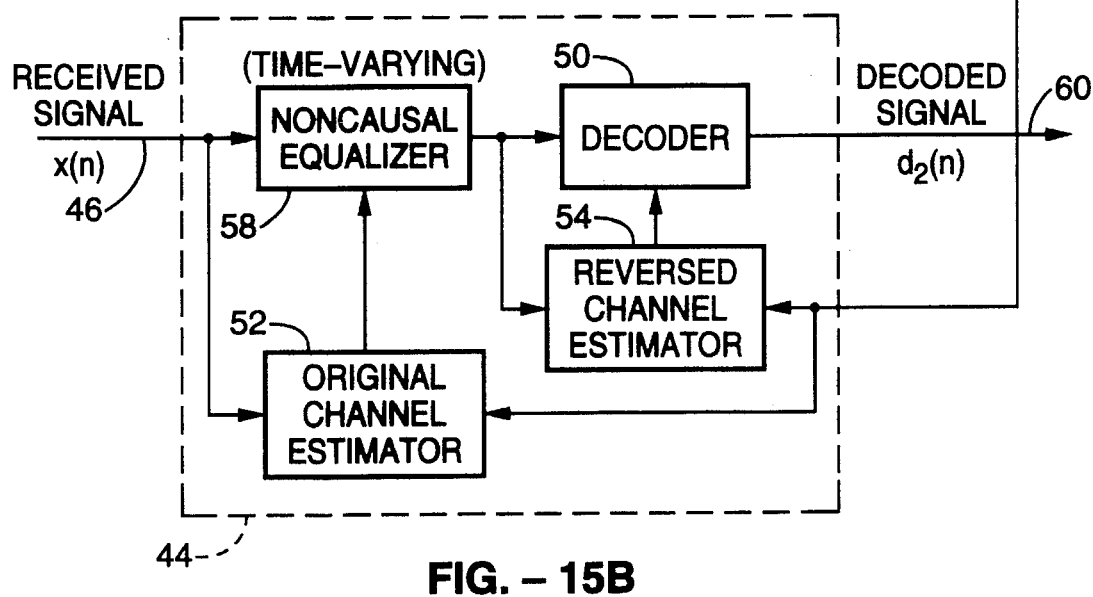
FIG. 15B is a functional block diagram of an "optimal" allpass filter in accordance with the present invention incorporated with a decoder, and configured as a second stage of filtering for the filter shown in FIG. 15A.

Referring to FIG. 1, FIG. 15A and FIG. 15B, multipath shaping filter/decoder 28 is depicted in the two stage filter design shown in FIGS. 15A and 15B which also includes a decision feedback equalizer (DFE) decoder or a Viterbi decoder. In FIG. 15A a block diagram of an exemplary implementation of the "block" allpass equalizer (filter) described in Section 3 as first stage filter/decoder 42 is shown. In FIG. 15B a block diagram of an exemplary implementation of the "optimal" allpass equalizer (filter) described in Section 4 as a second stage filter/decoder 44 is shown. It will be appreciated that the "block" allpass filter of FIG. 15A can be implemented directly whereas, in order to use the "optimal" allpass equalizer of FIG. 15B the "block" allpass filter of FIG. 15A is used as a first stage of filtering.

In the two-stage implementation, the received signal 46 represented as x(n) is initially processed by the "block" allpass equalizer 48 as described in Section 3. For this stage a simple DFE decoder 50 can be used instead of the more complex Viterbi decoders. Implementation of original channel estimator 52 and reversed channel estimator 54 are as previously described. The first stage decoded signal 56, represented as $d_1(n)$, is available for use directly or for further processing. Note, however, that there can be increased bit error rate due to mismatching in the "block" allpass equalizer and the use of the non-optimal DFE decoder. Consequently, the MSE for the channel estimation is high. Despite the high MSE, an accurate channel estimation is possible by applying the averaging technique described in Section 1.

Once the first stage decoded signal 56 is obtained, the signal is used for purposes of channel estimation in the second stage "optimal" allpass filter. Once the channel estimation is obtained, the first stage decoded signal 56 is discarded and the process is repeated in the second stage for the same received signal 46, this time using the "optimal" allpass equalizer 58 described in Section 4. Here, however, decoder 50 would comprise a Viterbi or Multitrellis Viterbi decoder. The second stage decoded signal 60, represented as $d_2(n)$, is available for use directly or for further processing.

It will be appreciated that other combinations are possible such as:
Two Stage Filter/Decoder
    First stage—"block" allpass and DFE decoder
    Second stage—"optimal" allpass and DFE decoder
Three Stage Filter/Decoder
    First stage—"block" allpass and DFE decoder
    Second stage—"optimal" allpass and DFE decoder
    Third stage—"optimal" allpass and Viterbi decoder
Each additional stage increases the accuracy of the channel estimation, a crucial factor limiting the performance of both DFE decoders and Viterbi decoders.

7. Cascade of Causal and Non-Causal Equalizers

In Section 1, to ensure stability of the allpass equalizer the samples in the tail of the CIR following the largest sample were neglected. In most practical situations using Channels 4 and 5 the error incurred in this approximation is small. However, when the tail cannot be neglected an alternative approach is possible. The method uses a cascade of causal and non-causal filters, and does not require the computation of zeros of the CIR.

The causal filter is quasi-allpass and is given by:

$$A_c(z) = \frac{h_M}{\sum_{i=M}^{N-1} h_i z^{-1+M}} \quad (7)$$

where $A_c(z)$ is the causal filter. This filter cancels out, or reduces to negligible values, the tail of the CIR as exemplified in FIG. 16A and FIG. 16B.

Now that the tail has been eliminated, it is possible to cascade a non-causal allpass or quasi-allpass filter as described in Sections 2 and 5. The results are shown in FIG. 16C (without sharpening) and FIG. 16D (including sharpening). Note that in both cases the first non-zero sample of the obtained DIR is the largest, an ideal situation for a DFE decoder and many Viterbi decoders, especially, in a two-pass decoding scheme as described in Section 6.

8. Three-Path Channels

Figure 17:
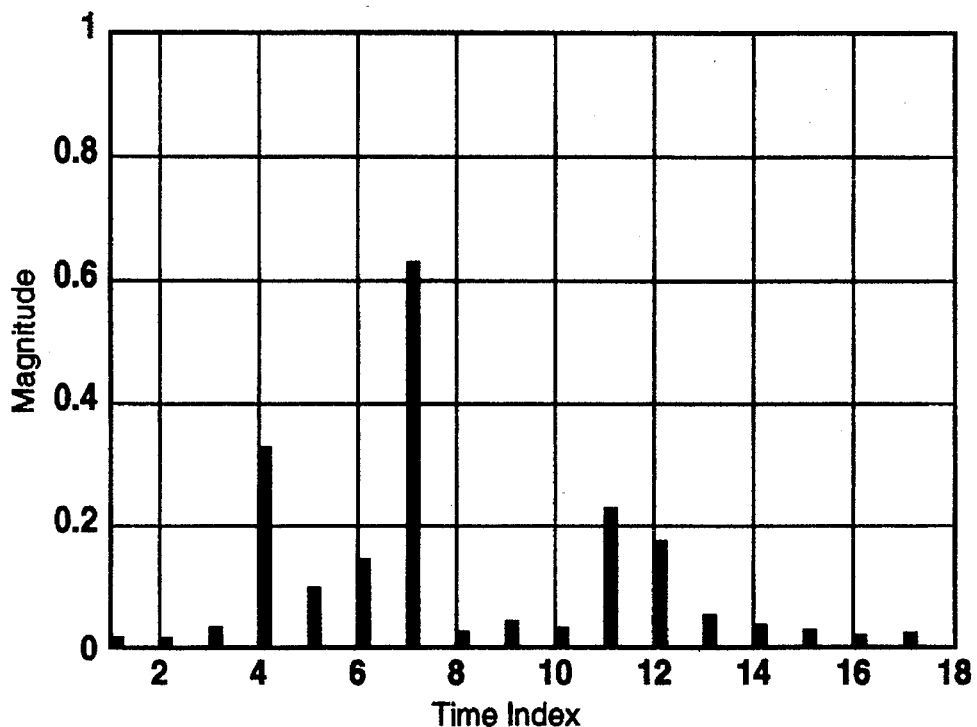
FIG. 17 depicts an exemplary original non-minimum phase channel impulse response for Channel 6.
Figure 18:
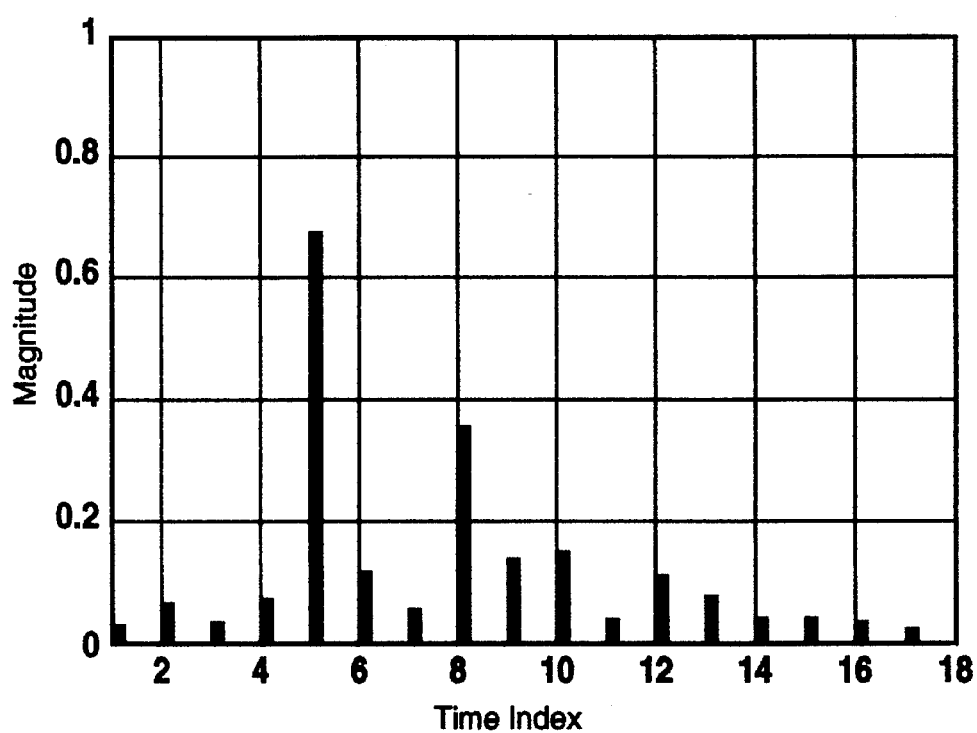
FIG. 18 depicts the desired impulse response obtained from the channel impulse response shown in FIG. 17 for three-path channels using the "block" allpass filter of the present invention.
Figure 19:
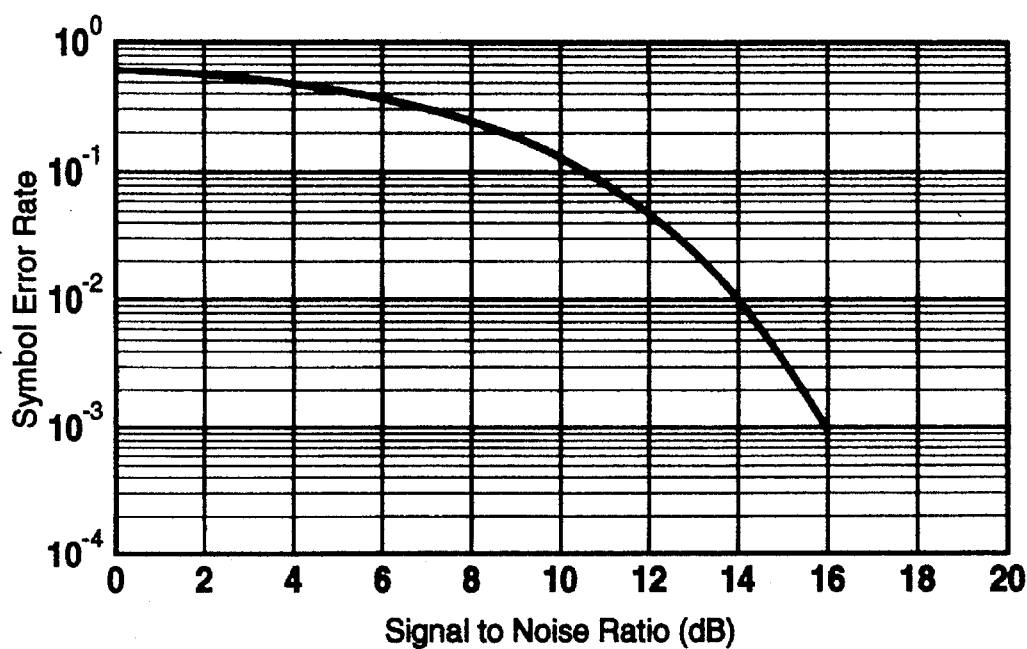
FIG. 19 shows the symbol error rate as a function of signal to noise ratio for a known C.C.I.R. Channel 5 using a Viterbi decoder.
Figure 20:
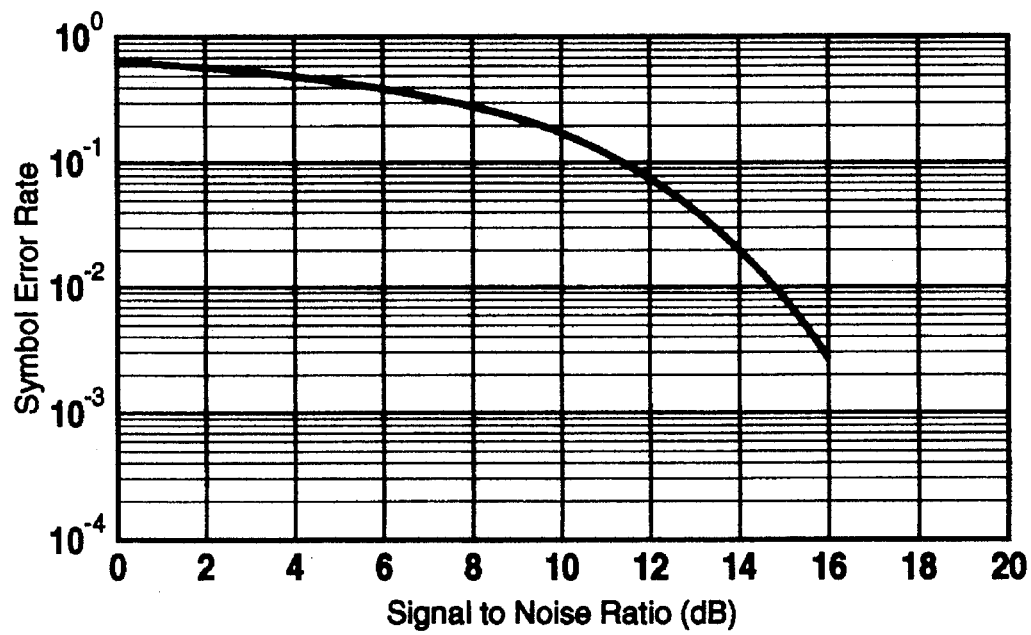
FIG. 20 shows the symbol error rate as a function of signal to noise ratio for a known C.C.I.R. Channel 5 using a Multitrellis Viterbi decoder.

The method described in Section 2 can be extended to the case where three paths are present. Here, the allpass filter is built with coefficients taken from the CIR according to Eq. (2) where M must always correspond to the channel sample of largest magnitude. Two cases can be distinguished depending on whether the second or the third path has the largest magnitude. When the third path is the largest, it is possible to both reverse and sharpen the channel. The effectiveness of the sharpening process depends on the channel characteristics. Computer simulations carried out using Channel 6 revealed that it is possible to reverse the channel using the "block" allpass, but only moderate sharpness is obtained due to the high dispersion of the paths. When the second path is the largest, it is possible to only reverse the channel without sharpening. This is the most difficult situation but even in this case satisfactory results were obtained. FIG. 17 and FIG. 18 illustrate the last case showing respectively the original CIR and the obtained DIR using the "block" allpass filter.

EXAMPLE 1

Computer simulation tests have been carried out to assess the performance of the method of the present invention. The HF channel simulator used was firmly based on C.C.I.R. recommendations. Only non-minimum phase cases using Channel 5 were considered. An 8-PSK scheme was adopted throughout. Both DFE decoders and the Multitrellis Viterbi decoder were considered. The results of the computer simulation tests are shown in FIG. 19 through FIG. 25.

Initially, the performance of the Multitrellis Viterbi decoder was compared with the full Viterbi decoder using a constant channel of length 5 with 3 non-zero samples. It can be seen from FIG. 19 and FIG. 20 that, compared with the optimal Viterbi, the reduction in tolerance to noise of the Multitrellis Viterbi decoder is less than 1 dB over the whole range of signal/noise ratios tested.

Figure 21:
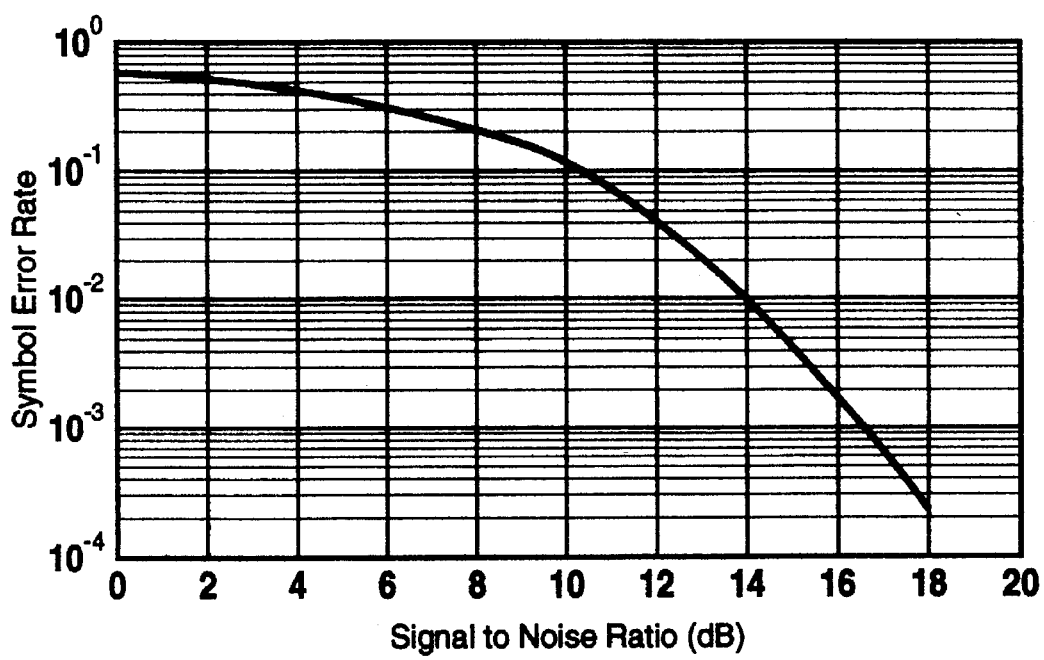
FIG. 21 shows the symbol error rate as a function of signal to noise ratio for a known C.C.I.R. Channel 5 using an "optimal" allpass filter with sharpening in accordance with the present invention in combination with a Multitrellis Viterbi decoder.

FIG. 21 shows the performance of the "optimal" (time-varying) equalizer (with sharpening) combined with the Multitrellis Viterbi decoder. The channel was established using prior knowledge of the transmitted data. The objective here was to obtain an upper bound in performance for the other systems tested next.

Figure 22:
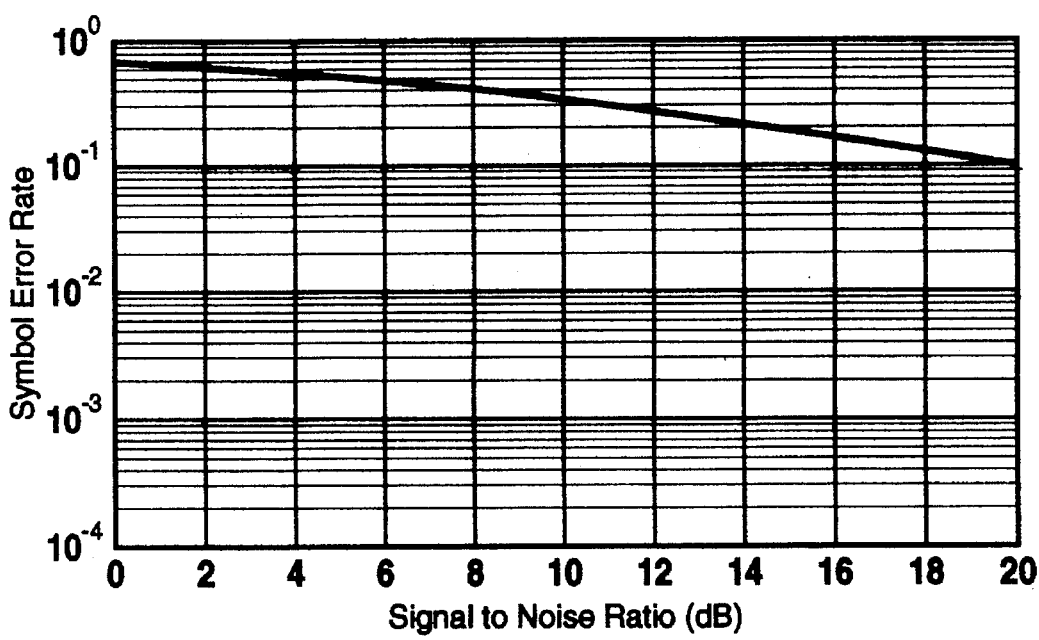
FIG. 22 shows the symbol error rate as a function of signal to noise ratio for a known C.C.I.R. Channel 5 using an "optimal" allpass filter without sharpening in accordance with the present invention in combination with a Multitrellis Viterbi decoder.

The result shown in FIG. 22 corresponds to the same conditions of FIG. 21 except that sharpening is not included. The poor performance is due to the large number of non-zero samples present in the DIR, violating the sharpness requirement of the Multitrellis Viterbi decoder.

FIG. 23 corresponds to the "block" allpass method (Section 3) using a DFE decoder. The unknown channel was estimated using the decoded data.

Further improvement is obtained using the 2-stage approach, where "block" non-causal implementation is followed by the "optimal" (time-varying) non-causal realization. FIG. 24 shows the performance obtained using a DFE decoder in both stages while FIG. 25 corresponds to a DFE decoder in the first stage and Multitrellis Viterbi decoder in the second stage.

As can be seen, therefore, the invention provides for shaping a time-varying non-minimum phase CIR of a radio frequency communications channel and extracting digital data transmitted over the communications channel by estimating the CIR, reversing the CIR and obtaining a minimum phase DIR by filtering the received radio frequency signal using a non-causal allpass filter operating in reversed time wherein the filter coefficients are determined from the estimated CIR, and using the DIR and filtered radio frequency signal to decode data contained in the signal of interest. Furthermore, it can be seen that enhanced system performance can be achieved by "block" allpass filtering followed by "optimal" allpass filtering. For "block" allpass filtering, the radio frequency signal is sampled and grouped into a series of consecutive overlapping radio frequency signal blocks, the CIR for a radio frequency signal block is estimated, the CIR is reversed and a minimum phase DIR is obtained by filtering the block using a non-causal allpass filter operating in reversed time wherein the filter coefficients are determined from the estimated CIR for the immediately preceding block, and the filtered radio frequency signal block and the DIR from the immediately preceding radio frequency signal block are used to decode data contained in said signal of interest. The process is repeated for each successive block. For "optimal" allpass filtering, a second estimation of the CIR is made using the decoded data from the "block" stage, the previously decoded data is discarded, the CIR is reversed and a second minimum phase DIR is obtained by filtering the received radio frequency signal using a non-causal time-varying allpass filter operating in reversed time wherein the filter coefficients are determined from the second estimated CIR, and the second DIR and the filtered radio frequency signal are used to decode data contained in said signal of interest. An output signal corresponding to the decoded data can then be generated.

Accordingly, it will be seen that this invention provides an effective and less complex method and apparatus for filtering multipath and Doppler spread interference from a signal of interest. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A method for shaping the channel impulse response of a radio frequency communications channel and extracting digital data transmitted over said communications channel, comprising the steps of:

(a) receiving and sampling a radio frequency signal on an antenna, said radio frequency signal containing digital information, said radio frequency signal being transmitted over a communications channel, said communications channel having a time-varying non-minimum phase channel impulse response, said radio frequency signal including a signal of interest and interference;

(b) estimating said channel impulse response for said radio frequency signal;

(c) filtering said received radio frequency signal using a non-causal digital allpass filter operating in reversed time, said digital allpass filter using filter coefficients determined from the estimated channel impulse response;

(d) estimating a minimum phase desired impulse response for said filtered radio frequency signal, said estimated desired impulse response being the time reversal of said estimated channel impulse response; and (e) decoding data contained in said signal of interest using the estimated desired impulse response and the filtered radio frequency signal.

2. A method of shaping the channel impulse response of a radio frequency communications channel and extracting digital data transmitted over said communications channel, comprising the steps of:

(a) receiving a radio frequency signal on an antenna, said radio frequency signal being transmitted over a communications channel having a time-varying non-minimum phase channel impulse response, said radio frequency signal including a signal of interest and interference;

(b) sampling said radio frequency signal and grouping the sampled data into a series of consecutive overlapping radio frequency signal blocks;

(c) estimating a current block channel impulse response;

(d) filtering the current radio frequency signal block using a non-causal digital allpass filter operating in reversed time, said allpass filter using filter coefficients determined from the previous block estimated channel impulse response;

(e) estimating a current block desired impulse response, said current block estimated desired impulse response being the time reversal of said current block estimated channel impulse response;

(f) using the current filtered radio frequency signal block and the current block estimated desired impulse response to decode data contained in said signal of interest;

(g) generating an output signal corresponding to the decoded data; and (h) repeating steps (c) through (g) for each successive radio frequency signal block.

3. A method for shaping the channel impulse response of a radio frequency communications channel and extracting digital data transmitted over said communications channel, comprising the steps of:

(a) receiving a radio frequency signal on an antenna, said radio frequency signal being transmitted over a communications channel, said communications channel having a time-varying non-minimum phase channel impulse response, said radio frequency signal including a signal of interest and interference;

(b) sampling said radio frequency signal and grouping the sampled Signal into a series of consecutive overlapping radio frequency signal blocks;

(c) estimating the channel impulse response for a radio frequency signal block;

(d) filtering said radio frequency signal block using a non-causal allpass filter operating in reversed time, said allpass filter using filter coefficients determined from the estimated channel impulse response for the immediately preceding radio frequency signal block;

(e) estimating a minimum phase desired impulse response from said filtered radio frequency signal block, said estimated desired impulse response being the time reversal of said estimated channel impulse response; and (f) decoding data contained in said signal of interest using the estimated desired impulse response and the filtered radio frequency signal block;

(g) wherein said channel impulse response is sampled over a sampling period T and said desired impulse response is determined according to:

$$H_{DIR}(z) \approx z^{-L} H^*_{CIR}(z) A(1/z^*)$$

where $H_{CIR}(z)$ is the channel transfer function $$H_{CIR}(z) = \sum_{i=0}^{L-1} h_i z^{-i}$$

A(z) is the non-causal allpass filter transfer function $$A(z) = \frac{\sum_{i=N}^{M} h^*_{N+M-i} z^{-1+N}}{\sum_{i=N}^{M} h_i z^{-i+N}}$$

A(1/z*) is the non-causal allpass filter transfer function in reversed time, $Z=e^{sT}$, s=the complex frequency variable, T=the sampling period, i=an index corresponding to an individual sample in the channel impulse response, L=the length of the channel impulse response, and $h_i$=the ith impulse response sample.

4. A method as recited in claim 1, further comprising the step of generating an output signal corresponding to the decoded data.

5. A method for extracting digital data from a radio frequency signal transmitted over a communications channel by shaping the channel impulse response, comprising the steps of:

(a) receiving a radio frequency signal on an antenna, said radio frequency signal being transmitted over a communications channel, said communications channel having a time-varying non-minimum phase channel impulse response, said radio frequency signal including a signal of interest and interference;

(b) sampling said radio frequency signal and grouping the sampled signal into a series of consecutive overlapping radio frequency signal blocks;

(c) estimating the channel impulse response for a radio frequency signal block;

(d) filtering said radio frequency signal block using a non-causal allpass filter operating in reversed time, said allpass filter using filter coefficients determined from the estimated channel impulse response for the immediately preceding radio frequency signal block;

(e) estimating a minimum phase desired impulse response for said filtered radio frequency signal block, said estimated desired impulse response being the time reversal of said estimated channel impulse response;

(f) using the filtered radio frequency signal block and the estimated desired impulse response to decode data contained in said signal of interest;

(g) generating an output signal corresponding to the decoded data;

(h) repeating steps (c) through (g) for each successive radio frequency signal block;

(i) performing a second estimation of said channel impulse response using said decoded data;

(j) discarding said decoded data;

(k) filtering said received radio frequency signal using a non-causal time-varying allpass filter operating in reversed time, said allpass filter using filter coefficients determined from the second estimated channel impulse response;

(l) estimating a second minimum phase desired impulse response, said second estimated desired impulse response being the time reversal of said second estimated channel impulse response;

(m) using the second estimated desired impulse response and the second filtered radio frequency signal to decode data contained in said signal of interest; and (n) generating an output signal corresponding to the second decoded data.

6. A method as recited in claim 5, further comprising the step of using a training signal to estimate the channel impulse response for the first radio frequency signal block.

7. A method as recited in claim 5, wherein said desired impulse response is determined according to:

$$H_{DIR}(z) \approx z^{-L} H^*_{CIR}(z) A(1/z^*)$$

where $H_{CIR}(z)$ is the channel transfer function $$H_{CIR}(z) = \sum_{i=0}^{L-1} h_i z^{-i}$$

A(z) is the non-causal allpass filter transfer function $$A(z) = \frac{\sum_{i=N}^{M} h^*_{N+M-i} z^{-1+N}}{\sum_{i=N}^{M} h_i z^{-i+N}}$$

A(1/z*) is the non-causal allpass filter transfer function in reversed time, $z=e^{sT}$, s=the complex frequency variable, T=the sampling period, i=an index corresponding to an individual sample in the channel impulse response, L=the length of the channel impulse response, and $h_i$=the ith impulse response sample.

8. A method of multipath channel shaping to extract digital data from a radio frequency signal, comprising the steps of:

(a) receiving a radio frequency signal on an antenna, said radio frequency signal being transmitted over a communications channel, said communications channel having a time-varying non-minimum phase channel impulse response, said radio frequency signal including a signal of interest and interference;

(b) sampling said radio frequency signal and grouping the sampled signal into a series of consecutive overlapping radio frequency signal blocks;

(c) estimating the channel impulse response for a radio frequency signal block;

(d) filtering said radio frequency signal block using a non-causal allpass filter operating in reversed time, said allpass filter using filter coefficients determined from the estimated channel impulse response for the immediately preceding radio frequency signal block;

(e) estimating a minimum phase desired impulse response for said filtered radio frequency signal block, said estimated desired impulse response being the reversal of said estimated channel impulse response;

(f) using the filtered radio frequency signal block and the estimated desired impulse response for the immediately preceding radio frequency signal block to decode data contained in said signal of interest;

(g) generating an output signal corresponding to the decoded data;

(h) repeating steps (c) through (g) for each successive radio frequency signal block;

(i) performing a second estimation of said channel impulse response using said decoded data;

(j) discarding said decoded data;

(k) filtering said received radio frequency signal using a non-causal time-varying allpass filter operating in reversed time, said allpass filter using filter coefficients determined from the second estimated channel impulse response;

(l) estimating a second minimum phase desired impulse response, said second estimated desired impulse response being the time reversal of said second estimated channel impulse response;

(m) using the second estimated desired impulse response and the second filtered received radio frequency signal to decode data contained in said signal of interest; and (n) generating an output signal corresponding to the second decoded data contained in said signal of interest.

9. A method as recited in claim 8, further comprising the step of using a training signal to estimate the channel impulse response for said first radio frequency signal block.

10. A method as recited in claim 9, wherein said desired impulse response is determined according to:

$$H_{DIR}(z) \approx z^{-L} H^*_{CIR}(z) A(1/z^*)$$

where $H_{CIR}(z)$ is the channel transfer function $$H_{CIR}(z) = \sum_{i=0}^{L-1} h_i z^{-i}$$

$A(z)$ is the non-causal allpass filter transform $$A(z) = \frac{\sum_{i=N}^{M} h^*_{N+M-i} z^{-i+N}}{\sum_{i=N}^{M} h_i z^{-i+N}}$$

$A(1/z^*)$ is the non-causal allpass filter transform in reversed time, $z=e^{sT}$, s=the complex frequency variable, T=the sampling period, i=an index corresponding to an individual sample in the channel impulse response, L=the length of the channel impulse response, and $h_i$=the ith impulse response sample.

* * * * *